United States Patent [19]

Hayashi

[11] Patent Number: 4,645,064

[45] Date of Patent: Feb. 24, 1987

[54] SCREW CONVEYOR

[76] Inventor: Torahiko Hayashi, 3-4, Nozawa-machi, Utsunomiya-shi, Tochigi-ken, Japan

[21] Appl. No.: 809,581

[22] Filed: Dec. 16, 1985

[30] Foreign Application Priority Data

Dec. 17, 1984 [JP] Japan ................................. 59-191161

[51] Int. Cl.⁴ ............................................. B65G 47/19
[52] U.S. Cl. .................................... 198/533; 198/723; 222/404
[58] Field of Search ..................... 198/550.1, 533, 722, 198/723, 474.1; 221/200; 222/236, 238, 252, 280, 281, 404; 366/154, 156, 186

[56] References Cited

U.S. PATENT DOCUMENTS 1,828,624  10/1931  Sedwick ........................... 198/474.1
2,579,527  12/1951  Weyerhaeuser ..................... 198/533
4,167,237   9/1979  Hayashi ............................. 222/404

Primary Examiner—Joseph E. Valenza
Attorney, Agent, or Firm—Guy W. Shoup

[57] ABSTRACT

A screw conveyor having a propelling device to push a plastic material onto a screw is provided. The propelling device comprises a roller, a rectangular vane, and a guide member, which are disposed above the screw and adjacent a wall of the housing of the screw conveyor. The roller is adapted to rotate about its out axis while its circumferential surface is in contact with the arcuate face of the guide member, so that one end of the vane received slidably in a rectangular slot protrudes from the roller pheriphery to push a plastic material onto the screw, thereby promoting an effective feeding of the plastic material.

4 Claims, 6 Drawing Figures

SCREW CONVEYOR

BACKGROUND OF THE INVENTION

1. Field of the Invention

The present invention relates to a screw conveyor, and particularly to a screw conveyor comprising a propelling device to push plastic material such as butter, jam, and confectionery or bread dough, onto the screw of a screw conveyor.

2. Description of Prior Art

In conventional screw conveyors for plastic materials, the so-called bridge phenomenon, namely, as phenomenon where a mass of sticky material sticks to opposite walls, straddling screws and refuses to flow into them, frequently occurs. Further, plastic material is liable to adhere to walls of a hopper, thus obstructing the downward flow of the plastic material, resulting in the need for manually removing the obstacle.

U.S. Pat. No. 4,167,237 discloses a pressure feeder, including pusher assemblies where a hollow cylindrical pusher member, oval-shaped in cross-section, turns by a pinion gear to push a plastic material onto the screws of a screw feeder. Although this pusher member usually operates satisfactorily, it requires a fairly complex mechanism as it has a rack-and-pinion in a hollow cylindrical pusher member, which results in higher production costs. Further, the cylindrical pusher member requires a relatively large space. This is disadvantageous in that it necessitates overcoming a relatively large inertial resistance, and the screw feeder utilizing this cylindrical pusher member is inevitably large.

SUMMARY OF THE INVENTION

An object of the present invention is to provide a screw conveyor which effectively delivers a plastic material.

Another object of the present invention is to provide a screw conveyor in which a bridge phenomenon is avoided.

A further object of the present invention is to provide a screw conveyor with a propelling device to push the plastic material, such as confectionery or bread dough, onto the screw of the screw conveyor.

A still further object of the present invention is to provide a screw conveyor with a propelling device of a relatively simple mechanism which effectively pushes the plastic material onto the screw, thereby efficiently feeding the charged plastic material from the hopper to the outlet of the screw conveyor.

In one aspect of the present invention a screw conveyor is provided, comprising a housing, at least one screw horizontally disposed in the housing, and a hopper mounted on the housing, the housing being provided with an outlet at the delivery end of the screw, characterized by at least one driven roller disposed horizontally above the screw and adjacent a wall of the housing, at least one vane received slidably in at least one slot bored along the longitudinal axis of the roller and across the circular cross section thereof, and a guide member provided on the wall and with an arcuate face fitting a portion of the periphery of the roller and at least an arm extending generally horizontally from the lowest point of the guide member.

According to the present invention, a propelling device to push a plastic material is arranged above the screw of the screw conveyor and adjacent a wall of a housing, and comprises a driven roller having at least one vane within at least one slot along the axis of the driven roller, and a guide member. The vane is preferably rectangular and is longer than the diameter of the driven roller and slidably movable within the slot, preferably a rectangular slot, so that when one end of it is urged or pushed, its opposite end protrudes from the roller. The driven roller rotates about its axis by a conventional driving means. The guide member is provided on the wall of the housing and has an arcuate face fitting a portion of the periphery of the driven roller and at least one arm extending generally horizontally from the lowest point of the guide member.

The roller is arranged so that a portion of the circumferential surface thereof may be in contact with the arcuate face of the guide member, whereby, when the roller is rotated, the vane received in the slot is pushed by the arm or the arcuate face of the guide member to protrude from its one end. When the roller is rotated in the right direction, the protruding portion of the vane pushes the plastic material onto the available space or area of the screw, and thus, even when plastic material of low fluidity is charged in the hopper, the occurrence of the bridge phenomenon, or the adherence of the plastic material to walls of the hopper, can be avoided so as to effectively feed the material. A single vane disposed within a slot can certainly push the plastic material, but a plurality of vanes may be provided in a plurality of slots to carry out a more effective and complete pushing.

Since the propelling device according to the present invention has a relatively simple mechanism comprising a driven roller with at least one vane and a guide member, advantages, as for instance, less inertial resistance and therefore easier control of the rotation speed of the roller, and less space for installing it, can be obtained.

DESCRIPTION OF THE PREFERRED EMBODIMENTS

Figure 1:
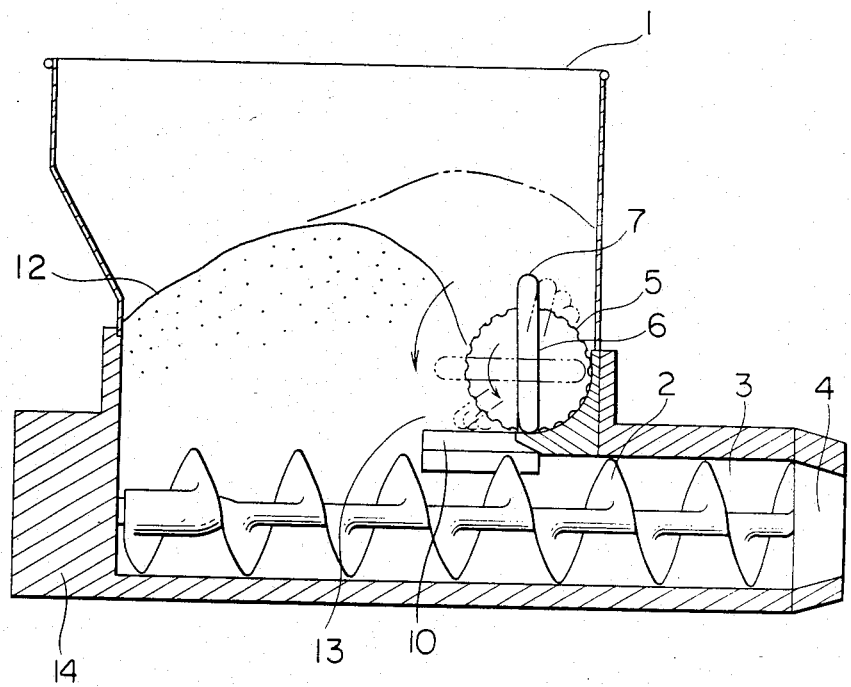
FIG. 1 is a schematic longitudinal sectional view of a first embodiment of the present invention.
Figure 2:
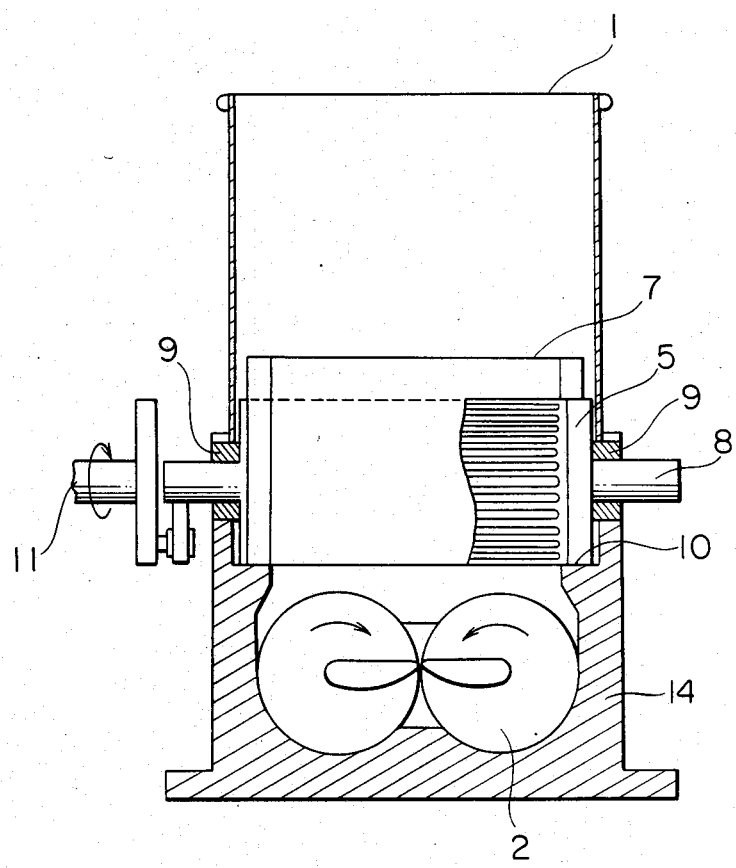
FIG. 2 is a schematic transverse sectional view of the first embodiment of the present invention.

Referring to the attached drawings, FIGS. 1 and 2 show a screw conveyor, including a housing 14, a pair of screws 2, an outlet 4, and a hopper 1. A propelling device is provided above the screws and adjacent a wall of the housing 14, and comprises a driven roller 5 having a rectangular vane 7 received therein and a guide member 10. The hopper 1 is mounted on a housing 14.

The rectangular vane 7 is longer than the diameter of the roller 5 in width and received slidably in a rectangular slot 6.

In FIG. 2, the driven roller 5 is partly broken away to show the rectangular vane 7 received within the rectangular slot 6, and a dotted line shows the periphery of the driven roller. A plurality of lateral grooves on the roller 5 helps the roller to frictionally engage the plastic material.

The driven roller 5 is disposed perpendicularly to the axes of the screws 2, and its shaft 8 is rotatably supported by bearings 9 mounted on the upper portion of the housing 14. The roller is rotated by a drive shaft 11, which is in turn driven by a motor (not shown).

Figure 5:
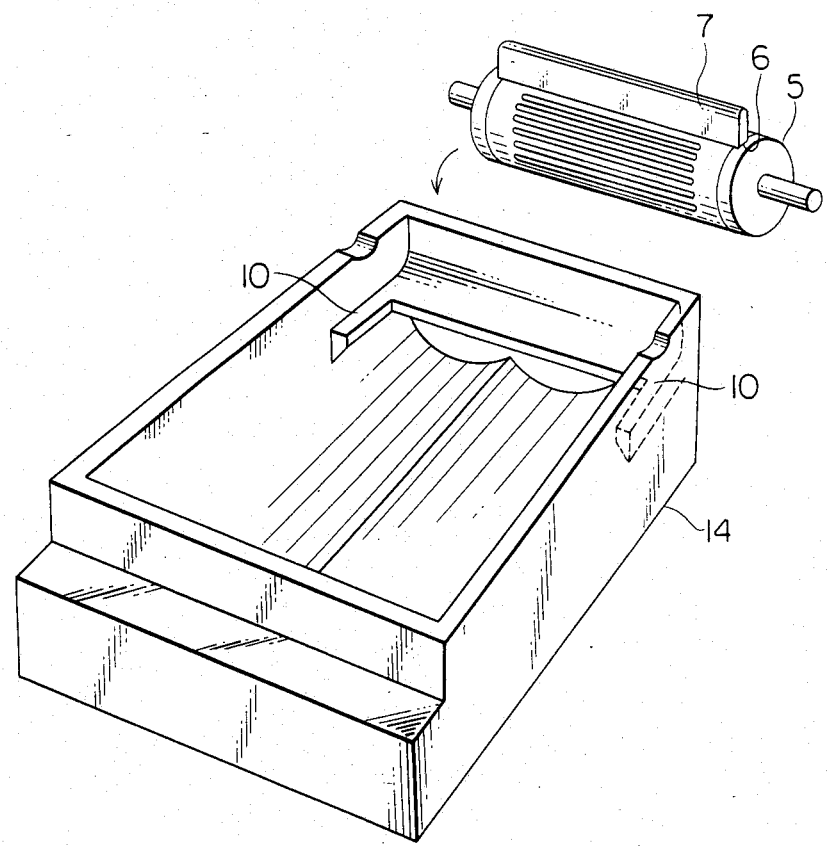
FIG. 5 is a schematic perspective view showing a relationship between a housing, a guide member, and a driven roller having a rectangular vane within a rectangular slot bored therein.

FIG. 5 illustrates a relationship between the driven roller 5, the rectangular vane 7, the guide member 10, and the housing 14. The guide member 10 has an arcuate face which fits a portion of the periphery of the driven roller 5, and two arms which extend generally horizontally from the lowest point of the guide member 10. The rectangular slot 6 is bored along the longitudinal axis of the driven roller 5 and diametrically across the circular cross section of the driven roller 5. This rectangular slot is preferably provided so that the slot may intersect the axis of the roller.

The guide member 10 is mounted on the wall of the housing 14 or may be formed as a portion of the wall of the housing 14.

When the driven roller 5 is rotated and the plastic material 12 is charged from the hopper 1, the rectangular vane 7, moving in a direction as shown by an arrow in FIG. 1, is pushed, first by the arms of the guide member 10, then by the arcuate portion thereof, so that one end thereof protrudes from the periphery of the driven roller 5 and pushes the plastic material onto an inlet portion 13 of the housing 14, thereby further pushing the material onto the screws 2.

Thus, one end of the rectangular vane is progressively pushed and the opposite end protrudes from the periphery of the driven roller 5, whereby the plastic material 12 charged from the hopper 1 is continuously fed onto the screws without the bridge phenomenon, on the adherence of the material to the walls of the housing 14, occuring.

Although the first embodiment of the present invention shows the rectangular vane and slot, they may take any form, provided that a vane can slidably move within a slot and one end of the vane can protrude from the periphery of the driven roller.

Figure 3A:
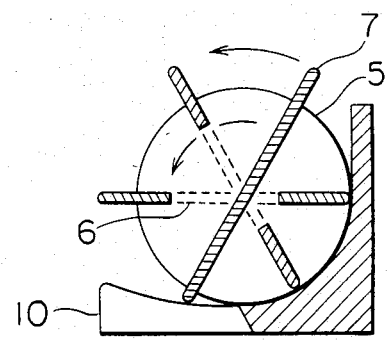
FIG. 3(A) is a cross-sectional view of the driven roller of a second embodiment of the present invention, which illustrates three rectangular vanes, each being assembled into one vane from two separate pieces slidably received in rectangular slots of a driven roller.
Figure 3B:
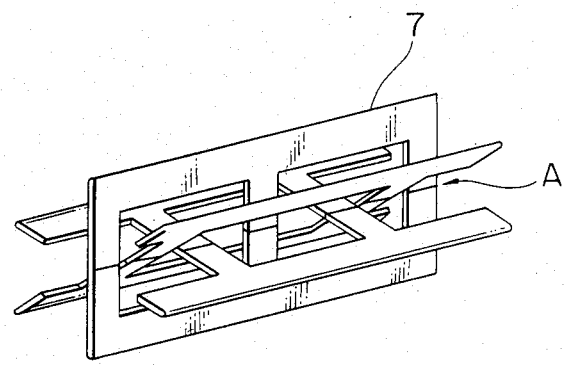
FIG. 3(B) is a perspective view of the rectangular vanes of the second embodiment of the present invention.

FIGS. 3(A) and 3(B) illustrate three rectangular vanes 7 and a guide member 10, an arm of which has a slightly arcuate face.

Each rectangular vane 7 is assembled from two stamped plates, each having a shape as is shown in FIG. 3(B). Each plate is connected to its mating plate at A. If the vane takes the shape as shown in FIG. 3(B), each vane can be received in the corresponding slot. Other shapes can be readily conceived to attain the purpose.

The slightly arcuate face of the arm of the guide member 10 can smoothly and gradually push the ends of the rectangular vanes 7.

The second embodiment of the present invention, unlike the first embodiment, very smoothly pushes the plastic material, and this is caused by a plurality of vanes.

Figure 4:
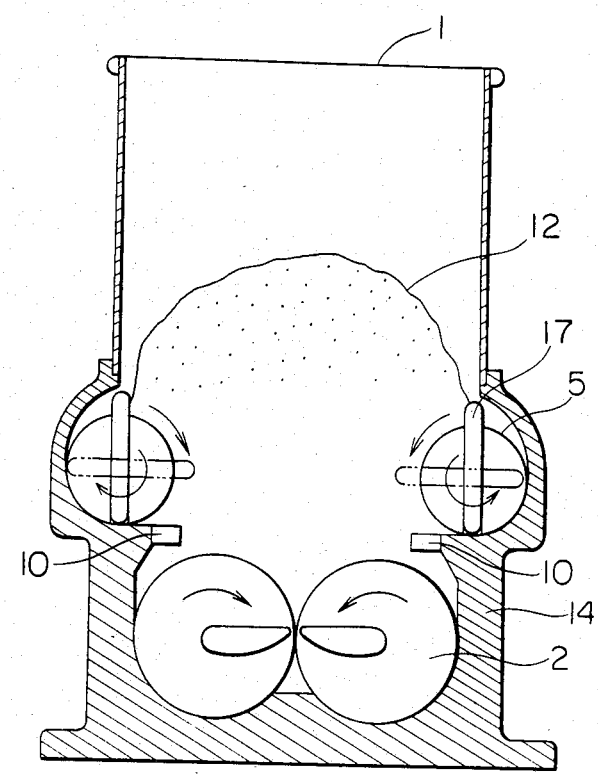
FIG. 4 is a schematic transverse sectional view of a third embodiment of the present invention, showing two propelling devices.

A third embodiment of the present invention has two propelling devices as shown in FIG. 4. Two driven rollers 5 receive vanes 17 within their slots and are disposed at the top of the housing 14 and their axes are parallel with the axes of the screws 2.

As the third embodiment provides two propelling devices along each of the screws 2, the plastic material can be exactly pushed without it adhering to the wall of the housing 14 or the hopper 1.

In the aforesaid embodiments, the slot 6 is provided approximately across the whole width of the driven roller 5, but two or more relatively shorter slots can also be provided at optional locations in place of the slot of the whole width. Accordingly, a plurality of integrally formed vanes are received in the slots.

As described above, by providing a vane which alternately protrudes from and retracts in a driven roller, the plastic material charged in the hopper of the screw conveyor according to the present invention is effectively propelled onto the screw of the screw conveyor, thereby enabling the continuous feeding of the plastic material, such as butter, jam, or cream, from the outlet of the screw conveyor onto a next processing apparatus.

What is claimed is:

1. An screw conveyor comprising a housing, at least one screw horizontally disposed in the housing, and a hopper mounted on the housing, the housing being provided with an outlet at the delivery end of the screw, characterized by at least one driven roller disposed horizontally above the screw and inside said hopper and adjacent a wall of said hopper, at least one vane, having a length greater than the diameter of said roller, received slidably in at least one slot bored along the longitudinal axis of the roller and across the circular cross section thereof, and a guide member provided on said wall and with an arcuate face fitting a portion of the periphery of the roller and at least an arm extending generally horizontally from the lowest point of the guide member and said at least one vane being urged by said arm to retract into said roller on the side of said roller adjacent said arm and to simultaneously project from said roller on the opposite side of said roller.

2. A screw conveyor of claim 1, wherein the axis of the roller is parallel to the axis of the screw.

3. A screw conveyor of claim 1, wherein the axis of the roller is perpendicular to the axis of the screw.

4. A screw conveyor of claim 1, wherein the vane and the slot are rectangular and complementary to each other.

* * * * *